(12) United States Patent
Hong

(10) Patent No.: US 8,754,989 B2
(45) Date of Patent: Jun. 17, 2014

(54) SIGNAL PROCESSING APPARATUS AND CONTROL METHOD THEREOF

(75) Inventor: Sang-min Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1493 days.

(21) Appl. No.: 11/962,277

(22) Filed: Dec. 21, 2007

(65) Prior Publication Data

US 2009/0040388 A1 Feb. 12, 2009

(30) Foreign Application Priority Data

Aug. 6, 2007 (KR) .................. 10-2007-0078791

(51) Int. Cl.
*H04N 9/77* (2006.01)
*H04N 9/78* (2006.01)

(52) U.S. Cl.
USPC ............................ 348/663; 348/665; 348/668

(58) Field of Classification Search
USPC ......................... 348/665–670, 663
See application file for complete search history.

(56) References Cited

U.S. PATENT DOCUMENTS

| | | | | |
|---|---|---|---|---|
| 4,555,723 A | * | 11/1985 | Pritchard | 348/666 |
| 6,278,492 B1 | | 8/2001 | Nakamura | |
| 6,278,495 B1 | * | 8/2001 | Lowe et al. | 348/665 |
| 7,327,405 B1 | * | 2/2008 | Lowe et al. | 348/665 |
| 7,420,624 B2 | * | 9/2008 | Lin et al. | 348/666 |
| 7,420,625 B1 | * | 9/2008 | Woodall | 348/668 |
| 7,535,515 B2 | * | 5/2009 | Bacche et al. | 348/666 |
| 2004/0189875 A1 | * | 9/2004 | Zhai et al. | 348/669 |
| 2005/0134745 A1 | * | 6/2005 | Bacche et al. | 348/630 |
| 2006/0082645 A1 | * | 4/2006 | Abe et al. | 348/65 |
| 2006/0197877 A1 | * | 9/2006 | Chao | 348/666 |

OTHER PUBLICATIONS

Communication, dated Oct. 31, 2013, issued by the Korean Intellectual Property Office, in counterpart Application No. 10-2007-0078791.

* cited by examiner

*Primary Examiner* — Randy Flynn
(74) *Attorney, Agent, or Firm* — Sughrue Mion, PLLC

(57) ABSTRACT

A signal processing apparatus and a control method thereof are provided. The signal processing apparatus includes: a comb filter which divides a luminance signal and a chrominance signal from an input video signal and outputs a luminance level of the luminance signal and a color level of the chrominance signal; an output unit which outputs one of the luminance level output by the comb filter and a blurred luminance level obtained by blurring the luminance level; and a controller which determines whether the luminance level output by the comb filter includes the color level, and controls the output unit to output the blurred luminance level if the color level is included in the luminance level, and output the luminance level if the color level is not included therein.

15 Claims, 4 Drawing Sheets

SIGNAL PROCESSING APPARATUS AND CONTROL METHOD THEREOF

CROSS-REFERENCE TO RELATED APPLICATION

This application claims priority from Korean Patent Application No. 10-2007-0078791, filed on Aug. 6, 2007 in the Korean Intellectual Property Office, the disclosure of which is incorporated herein by reference.

BACKGROUND OF INVENTION

1. Field of Invention

Apparatuses and methods consistent with the present invention relate to a signal processing apparatus and a control method thereof, and more particularly, to a signal processing apparatus which can definitely determine division of a luminance signal and a chrominance signal included in an analog video signal, and a control method thereof.

2. Description of Related Art

In related art, a composite signal of a quadrature modulated color television (TV), for example, a National Television System Committee (NTSC) or a Phase Alternating Line (PAL) system includes a luminance signal and a chrominance signal which are mixed with each other to efficiently use a limited frequency band in transmission.

The luminance signal is processed by frequency modulation/demodulation while the chrominance signal is processed by low-band frequency conversion. That is, the luminance signal and the chrominance signal are processed by different methods.

Thus, a color TV as a receiver should divide the luminance signal and the chrominance signal from the input analog video signal, which is performed through a comb filter in the related art.

However, it is not easy to properly divide the luminance signal and the chrominance signal since the luminance signal and the chrominance signal co-exist in a certain frequency band due to the properties of the input video signal. If the luminance signal and the chrominance signal are divided incorrectly, the chrominance signal may be included in the luminance signal, and thus, errors such as mesh noises may occur and picture quality may be lowered.

SUMMARY OF INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a signal processing apparatus which determines whether a luminance signal and a chrominance signal are correctly divided from an analog video signal and prevents errors such as noises, and a control method thereof.

According to an aspect of the present invention, there is provided a signal processing apparatus, including: a comb filter which divides a luminance signal and a chrominance signal from an input video signal and outputs a luminance level of the luminance signal and a color level of the chrominance signal; an output unit which outputs one of the luminance level output by the comb filter and a blurred luminance level obtained by blurring the luminance level; and a controller which determines whether the luminance level output by the comb filter includes the color level, and controls the output unit to output the blurred luminance level if the color level is included in the luminance level, and output the luminance level if the color level is not included therein.

The comb filter may include a motion detector which calculates a motion value by comparing a current frame with a previous frame, and divide the luminance signal and the chrominance signal based on the motion value detected by the motion detector.

The controller may include a noise detector which determines that the luminance level includes the color level if one of a plurality of conditions including the luminance level, the color level, the blurred luminance level and the motion value is satisfied.

The noise detector may filter the luminance level based on a color sub carrier, calculate a filter luminance level by subtracting the blurred luminance level from the filtered luminance level, and normalize and core the filter luminance level based on the blurred luminance level.

The conditions may comprise conditions that the cored output value has different cores per line, the motion value is in a preset range and an average color level of neighboring pixels is a preset value or above.

According to another aspect of the present invention there is provided a control method of a signal processing apparatus, the control method including: dividing a luminance signal and a chrominance signal from an input video signal; outputting a luminance level of the luminance signal and a color level of the chrominance signal; determining whether the output luminance level includes the color level; controlling to output a blurred luminance level obtained by blurring the luminance level if the luminance level includes the color level and controlling to output the luminance level if the luminance level does not include the color level.

The dividing the luminance signal and the chrominance signal may include dividing the luminance signal and the color signal based on a motion value that is calculated by comparing a current frame with a previous frame.

The determining whether the luminance level includes the color level may include determining that the luminance level includes the color level if one of a plurality of conditions including the luminance level, the color level, the blurred luminance level and the motion value is satisfied.

The determining whether the luminance level includes the color level may include filtering the luminance level based on a color sub carrier; calculating a filter luminance level by subtracting the blurred luminance level from the filtered luminance level; and normalizing and coring the filter luminance level based on the blurred luminance level.

The conditions may comprise conditions that the value output by the normalizing and coring the filter luminance level based on the blurred luminance level has different cores per line, the motion value is in a preset range, and an average color level of neighboring pixels is a preset value or above.

BRIEF DESCRIPTION OF DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENT OF THE PRESENT INVENTION

Hereinafter, exemplary embodiments of the present invention will be described with reference to accompanying drawings, wherein like numerals refer to like elements and repetitive descriptions will be avoided as necessary.

Figure 1:
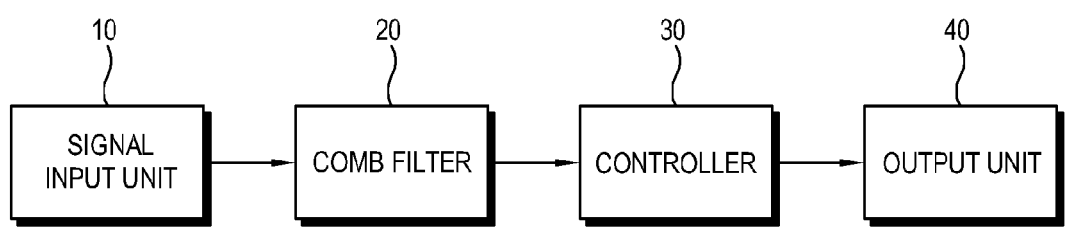
FIG. 1 is a control block diagram of a signal processing apparatus according to an exemplary embodiment of the present invention.

FIG. 1 is a control block diagram of a signal processing apparatus according to an exemplary embodiment of the present invention. As shown therein, the signal processing apparatus according to the exemplary embodiments of the present invention includes a signal input unit 10, a comb filter 20, a controller 30 and an output unit 40.

The signal input unit 10 is provided to receive analog/digital signals. The signal input unit 10 may include a tuner (not shown) to receive a broadcasting signal, and an external connection terminal (not shown) to receive a video signal from an external device.

The external connection terminal may include an input terminal such as a Composite Video Baseband Signal (CVBS), S-video, Component, PC-signal, Digital Video/Visual Interactive (DVI) and High-Definition Multimedia Interface (HDMI) to receive a video signal corresponding to various external sources.

Figure 2:
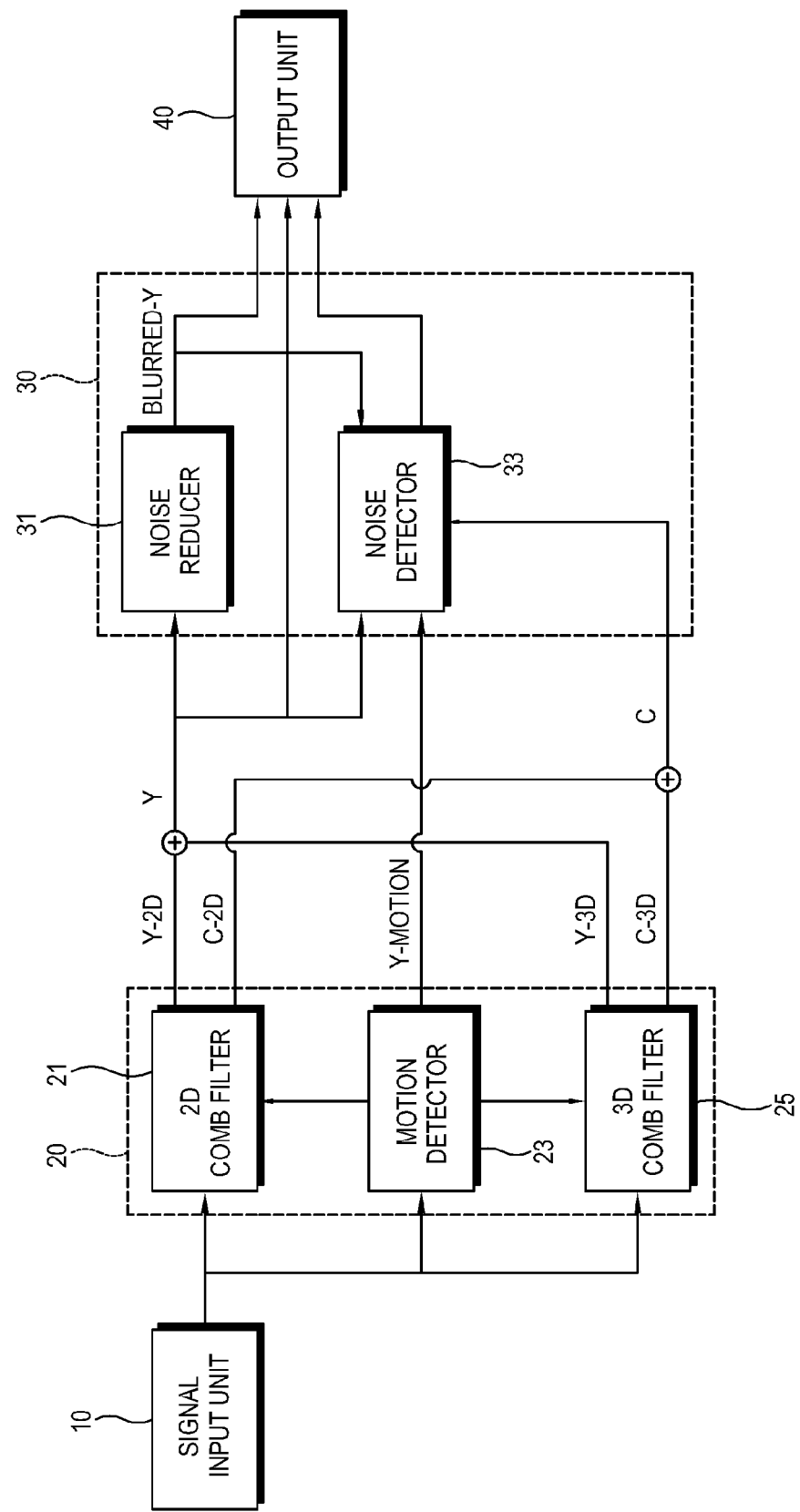
FIG. 2 illustrates a comb filter and a controller of the signal processing apparatus according to the exemplary embodiment of the present invention.

If a video signal input through the signal input unit 10 includes an analog video signal, the comb filter 20 divides a luminance signal and a chrominance signal from the video signal. As shown in FIG. 2, the comb filter 20 includes a 2D comb filter 21, a 3D comb filter 25 and a motion detector 23.

The motion detector 23 detects whether the input video signal includes a motion, and calculates a Y-motion value (Y-MOTION). Here, the motion detector 23 may compare a pixel coordinate of a current frame with that of a previous frame to calculate the Y-motion value. The motion detector 23 may include an analog-digital converter (ADC). The calculated Y-motion value ranges from 0 to $2^n-1$ according to the number of bits of the ADC.

If the Y-motion value is 0, it means that the video signal does not include a motion. Then, a luminance level Y-3D of the luminance signal and a color level C-3D of the chrominance signal divided from the video signal are output by the 3D comb filter 25. If the Y-motion value is high, i.e. $2^n-1$, it means that the video signal includes a lot of motions. Then, the luminance level Y-2D of the luminance signal and the color level C-2D of the chrominance signal divided from the video signal are output through the 2D comb filter 21. If the Y-motion value is higher than 0 and lower than $2^n-1$, the luminance level Y-3D and the color level C-3D output through the 3D comb filter 25 are blended with the luminance level Y-2D and the color level C-2D output through the 2D comb filter 21 based on the Y-motion value, thereby outputting a final luminance level Y and a final color level C.

If the motion detector 23 detects that few or no motion exists even though the pixel actually has a lot of motions, the chrominance signal is divided as the luminance signal, thereby causing errors such as mesh noises.

The controller 30 determines whether the luminance signal divided by the comb filter 20 includes the chrominance signal. If the chrominance signal is included therein, the controller 30 outputs a blurred luminance signal not to display noises.

As shown in FIG. 2, the controller 30 according to the exemplary embodiment of the present invention includes a noise reducer 31 and a noise detector 33.

The noise reducer 31 outputs a blurred luminance level (BLURRED-Y) by blurring the luminance level Y output by the comb filter 20. The luminance level Y may be blurred by Gaussian filtering using a Gaussian mask. The blurred luminance level is supplied to the noise detector 33 and the output unit 40. Here, the noise reducer 31 may output the blurred luminance level by using various other filtering methods.

The noise detector 33 detects whether the luminance signal divided by the comb filter 20 includes the chrominance signal. The noise detector 33 may receive the luminance level Y and the color level C output by the comb filter 20, the blurred luminance level blurred by the noise reducer 31 and the Y-motion value calculated by the motion detector 23 to detect whether the luminance signal includes the chrominance signal.

The noise detector 33 according to the exemplary embodiment of the present invention includes a spatial filter 32, a color leveling unit 35, and a noise determiner 34.

Figure 3:
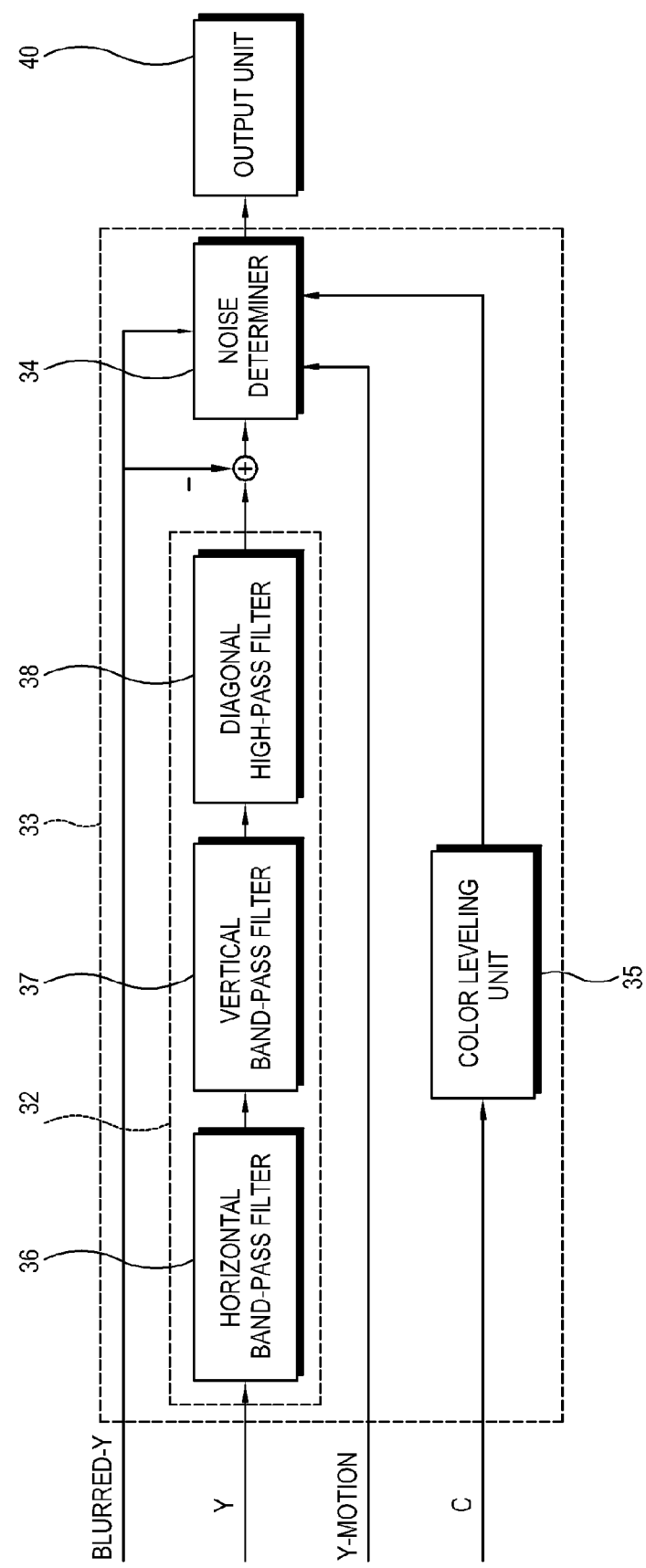
FIG. 3 illustrates the controller of the signal processing apparatus, in detail, according to the exemplary embodiment of the present invention.

Referring to FIG. 3, the spatial filter 32 filters the input video signal in horizontal, vertical and diagonal directions, centering on 3.58 MHz which is a frequency of a color sub carrier, to determine whether the luminance level Y divided by the comb filter 20 is in a color burst band.

To this end, the spatial filter 32 includes a horizontal band-pass filter 36, a vertical high-pass filter 37 and a diagonal high-pass filter 38. Three lines of the video signal may be filtered in horizontal and diagonal directions. The sequence of the filtering directions for the video signal may be changed. Thus, it is detectable whether the luminance level Y output by the comb filter 20 includes the color level C.

The color leveling unit 35 calculates an average value of the color level C output by the comb filter 20 with respect to an N*N pixel (N is a positive number) including a pixel from which the luminance signal is divided by the comb filter 20. As the chrominance signal may be influenced by neighboring pixels, it may be determined that the divided luminance signal includes the chrominance signal if the average value of the color level C in the N*N pixel is a preset value or above.

The noise determiner 34 determines whether the divided luminance signal includes the chrominance signal by using the blurred luminance level blurred by the noise reducer 31, a filter luminance level calculated by subtracting the blurred luminance level from the luminance level filtered by the spatial filter 32, the Y-motion value detected by the motion detector 23 and the presence or absence of the chrominance signal determined by the color leveling unit 35. Then, the noise determiner 34 supplies a determination result to the output unit 40.

More specifically, the noise determiner 34 normalizes the filter luminance level based on the blurred luminance level, and generates a sin wave having a value ranging between −1 and 1. The noise determiner 34 cores values between predetermined ranges (e.g. −0.03 to 0.03) into 0.

The noise determiner 34 compares a first value output by the coring process, a second value output by the foregoing process for a pixel delayed by one line and a third value output by the foregoing process for a pixel delayed by two lines.

If it is determined that a core of the first value is different from that of the second value, if the core of the second value is different from that of the third value, if the Y-motion value detected by the motion detector 23 ranges between 0 and high ($2^n-1$) or if the color level C exists in the pixel through the color leveling unit 35, the noise determiner 34 may determine that the divided luminance signal includes the chrominance signal, i.e., the noise is included.

The output unit 40 outputs the blurred luminance level blurred by the noise reducer 31 based on the determination result of the noise detector 33 if the luminance signal divided by the comb filter 20 includes the chrominance signal. If the luminance level Y divided by the comb filter 20 does not include the color level C, the output unit 40 outputs the luminance level Y divided by the comb filter 20.

If the luminance signal divided by the comb filter 20 includes the chrominance signal, the mesh noises occur. The mesh noises may not be displayed by replacing the concerned pixel with a blurred pixel.

The luminance level Y or the blurred luminance level output by the output unit 30 may be scaled or converted according to an output standard of a display unit (not shown) to be displayed on the display unit.

Figure 4:
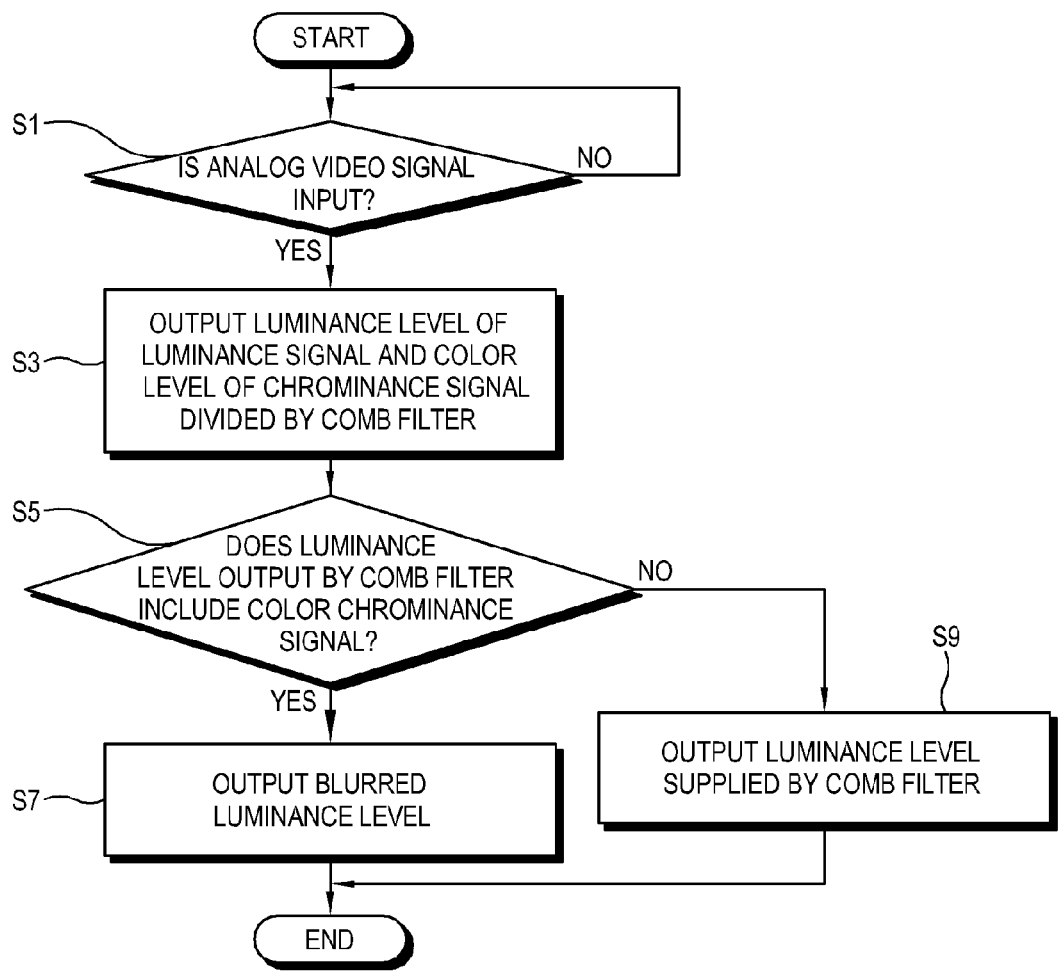
FIG. 4 is a flowchart to illustrate a control process of the signal processing apparatus according to the exemplary embodiment of the present invention.

A control method of the signal processing apparatus according to the exemplary embodiment of the present invention will be described with reference to FIG. 4.

As shown therein, if the analog video signal is input (S1), the input video signal is divided into the luminance level Y of the luminance signal and the color level C of the chrominance signal by the comb filter 20 (S3).

Here, the comb filter 20 outputs the luminance level Y and the color level C by blending the luminance level Y-2D and the color level C-2D output by the 2D comb filter 21, and the luminance level Y-3D and the color level C-3D output by the 3D comb filter 25 based on the Y-motion value calculated by the motion detector 23.

The controller 30 determines whether the output luminance level Y includes the chrominance signal (S5).

As described above, the controller 30 may determine whether the luminance level Y includes the chrominance signal by using the luminance level Y and the color level C output by the comb filter 20, the blurred luminance level blurred by the noise reducer 31 and the Y-motion value calculated by the motion detector 23.

If the chrominance signal is included therein, the controller 30 controls to output the blurred luminance level (S7). If the chrominance signal is not included therein, the controller 30 controls to output the luminance level Y output by the comb filter 20 (S9).

If the luminance signal divided by the comb filter includes the chrominance signal, the concerned pixel is replaced by the blurred pixel not to display the mesh noises.

As described above, the exemplary embodiments of the present invention provide signal processing apparatuses which determine whether a luminance signal and a chrominance signal are correctly divided from an analog video signal and prevent errors such as mesh noises occurring when the luminance signal and the chrominance signal are not divided, and a control method thereof.

Also, the exemplary embodiments of the present invention provide signal processing apparatuses which replace a pixel having an error with a blurred pixel if a luminance signal and a chrominance signal are not correctly divided from an analog video signal and the error occurs, and improves picture quality by not displaying the errors, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A signal processing apparatus comprising:
   a comb filter which divides a luminance signal and a chrominance signal from an input video signal and outputs a luminance level of the luminance signal and a color level of the chrominance signal;
   an output unit which outputs one of the luminance level output by the comb filter and a blurred luminance level; and
   a controller which receives as input the luminance level and the color level output from the comb filter, determines whether the luminance level output by the comb filter includes the color level, blurs the luminance level received from the comb filter, and controls the output unit to output the blurred luminance level if the color level is included in the luminance level, and to output the luminance level if the color level is not included therein.

2. The signal processing apparatus according to claim 1, wherein the comb filter comprises:
   a motion detector which calculates a motion value by comparing a current frame with a previous frame,
   wherein the comb filter divides the luminance signal and the chrominance signal based on the motion value detected by the motion detector.

3. The signal processing apparatus according to claim 2, wherein the controller comprises
   a noise detector which determines that the luminance level includes the color level if one of a plurality of conditions including the luminance level, the color level, the blurred luminance level and the motion value is satisfied.

4. The signal processing apparatus according to claim 3, wherein the noise detector filters the luminance level based on a color sub carrier, calculates a filter luminance level by subtracting the blurred luminance level from the filtered luminance level, and normalizes and codes the filter luminance level based on the blurred luminance level.

5. The signal processing apparatus according to claim 4, wherein the conditions comprise at least one of the coded output value has different codes per line, the motion value is in a preset range and an average color level of neighboring pixels is greater than or equal to a preset value.

6. The signal processing apparatus according to claim 1, wherein the comb filter comprises: a motion detector which calculates a motion value by comparing a current frame with a previous frame,
   wherein the comb filter divides the luminance signal and the chrominance signal based on the motion value detected by the motion detector, and
   wherein the controller further receives as input the motion value calculated by the motion detector.

7. The signal processing apparatus according to claim 6, wherein the controller comprises a noise reducer which receives the luminance level output by the comb filter and outputs the blurred luminance level to the output unit by blurring the luminance level output by the comb filter.

8. The signal processing apparatus according to claim 7, wherein the controller further comprises a noise detector which receives as input the blurred luminance level output by the noise reducer and the motion value and the luminance level output by the comb filter, and determines whether the luminance signal output by the comb filter includes the chrominance signal.

9. The signal processing apparatus according to claim 8, wherein the comb filter further comprises a two-dimensional (2D) comb filter and a three-dimensional (3D) comb filter, wherein the luminance level output from the comb filter comprises a 2D luminance level and a 3D luminance level, and wherein the color level comprises a 2D color level and a 3D color level.

10. The signal processing apparatus according to claim 9, wherein the 2D luminance level and the 3D luminance level are added together and input into the noise reducer, and wherein the 2D color level and the 3D color level are added together and input into the noise detector.

11. A control method of a signal processing apparatus, the control method comprising:

dividing a luminance signal and a chrominance signal from an input video signal;

determining whether a luminance level of the luminance signal comprises a color level of the chrominance signal;

blurring the luminance level of a pixel of the luminance signal;

outputting the blurred luminance level if the luminance level includes the color level and outputting the luminance level if the luminance level does not include the color level.

12. The control method according to claim 11, wherein the dividing the luminance signal and the chrominance signal includes dividing the luminance signal and the chrominance signal based on a motion value that is calculated by comparing a current frame with a previous frame.

13. The control method according to claim 12, wherein the determining whether the luminance level includes the color level comprises determining that the luminance level includes the color level if one of a plurality of conditions including the luminance level, the color level, the blurred luminance level and the motion value is satisfied.

14. The control method according to claim 13, wherein the determining whether the luminance level includes the color level comprises:

filtering the luminance level based on a color sub carrier;

calculating a filter luminance level by subtracting the blurred luminance level from the filtered luminance level; and normalizing and coding the filter luminance level based on the blurred luminance level.

15. The control method according to claim 14, wherein the conditions comprise at least one of the value output by the normalizing and coding the filter luminance level based on the blurred luminance level has different codes per line, the motion value is in a preset range, and an average color level of neighboring pixels is greater than or equal to a preset value.

\* \* \* \* \*